United States Patent [19]

Helbling

[11] Patent Number: 4,967,648
[45] Date of Patent: Nov. 6, 1990

[54] AUTOMATIC INFUSION-BEVERAGE APPARATUS

[76] Inventor: Edward Helbling, 1 Janet La., Commack, N.Y. 11725

[21] Appl. No.: 389,424

[22] Filed: Aug. 3, 1989

Related U.S. Application Data

[63] Continuation-in-part of Ser. No. 218,107, Jul. 12, 1988, Pat. No. 4,858,523.

[51] Int. Cl.⁵ .............................................. A47J 31/34
[52] U.S. Cl. .................................... 99/280; 99/302 R
[58] Field of Search ................. 99/279, 280, 281, 282, 99/283, 285, 290, 291, 294, 295, 298, 299, 300, 302 R, 304, 316; 426/433

[56] References Cited

U.S. PATENT DOCUMENTS

| | | | |
|---|---|---|---|
| 3,076,404 | 2/1963 | Manaresi | 99/298 |
| 3,872,781 | 3/1975 | Helbling | 99/282 |
| 4,207,809 | 6/1980 | Brill | 99/295 |
| 4,579,048 | 4/1986 | Stover | 99/295 |

Primary Examiner—Robert W. Jenkins
Attorney, Agent, or Firm—Herbert Dubno

[57] ABSTRACT

A coffee brewing machine utilizes a microprocessor controller and, preferably, preformed coffee filter packs in which the filter packs form a rectangular array. The microprocessor controller regulates the temperature of the prepared coffee in the reservoir at the base of the machine, the operation of the water distributor in the swingable lid or cover of the machine and of other operating conditions thereof.

20 Claims, 10 Drawing Sheets

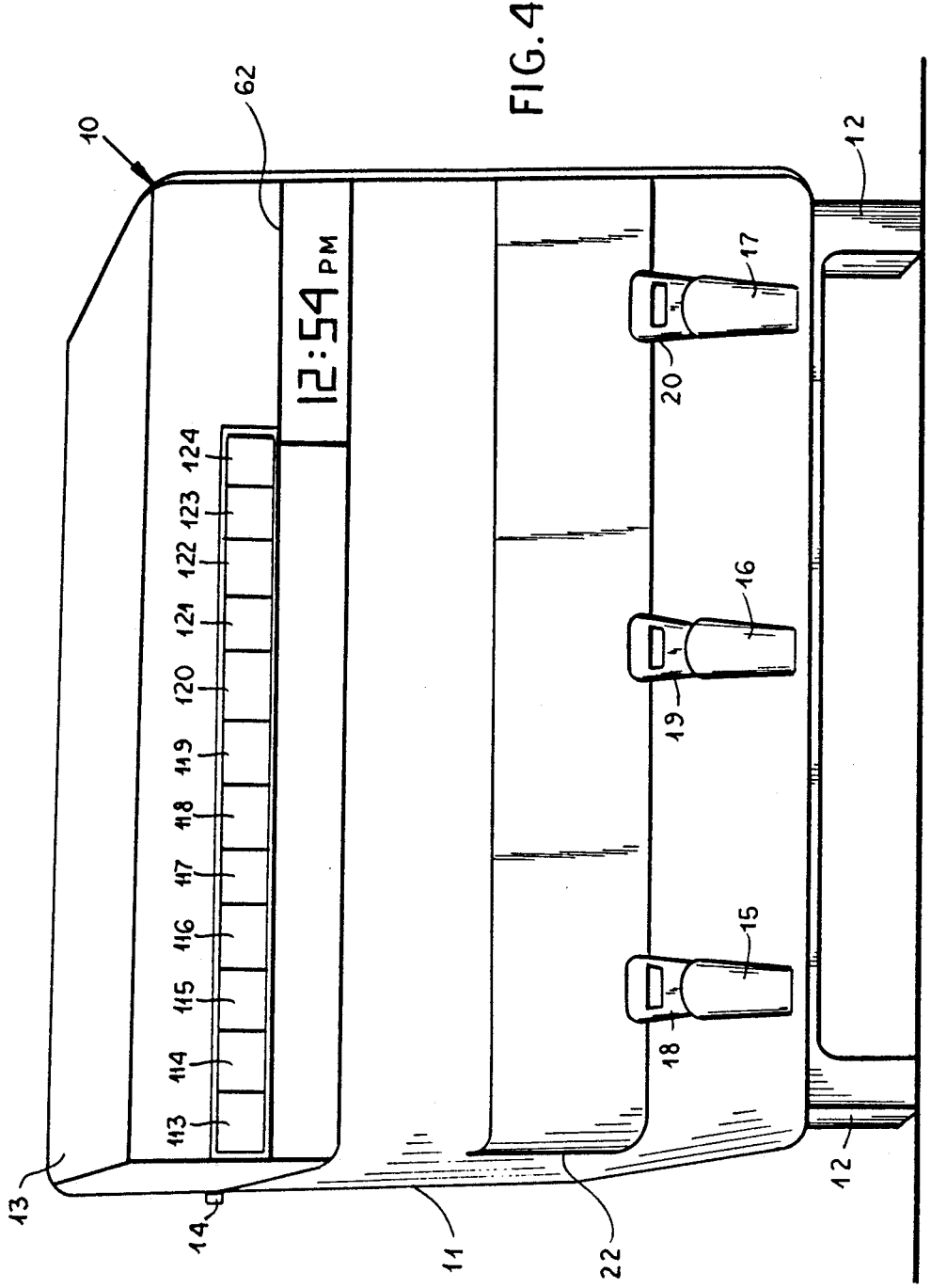

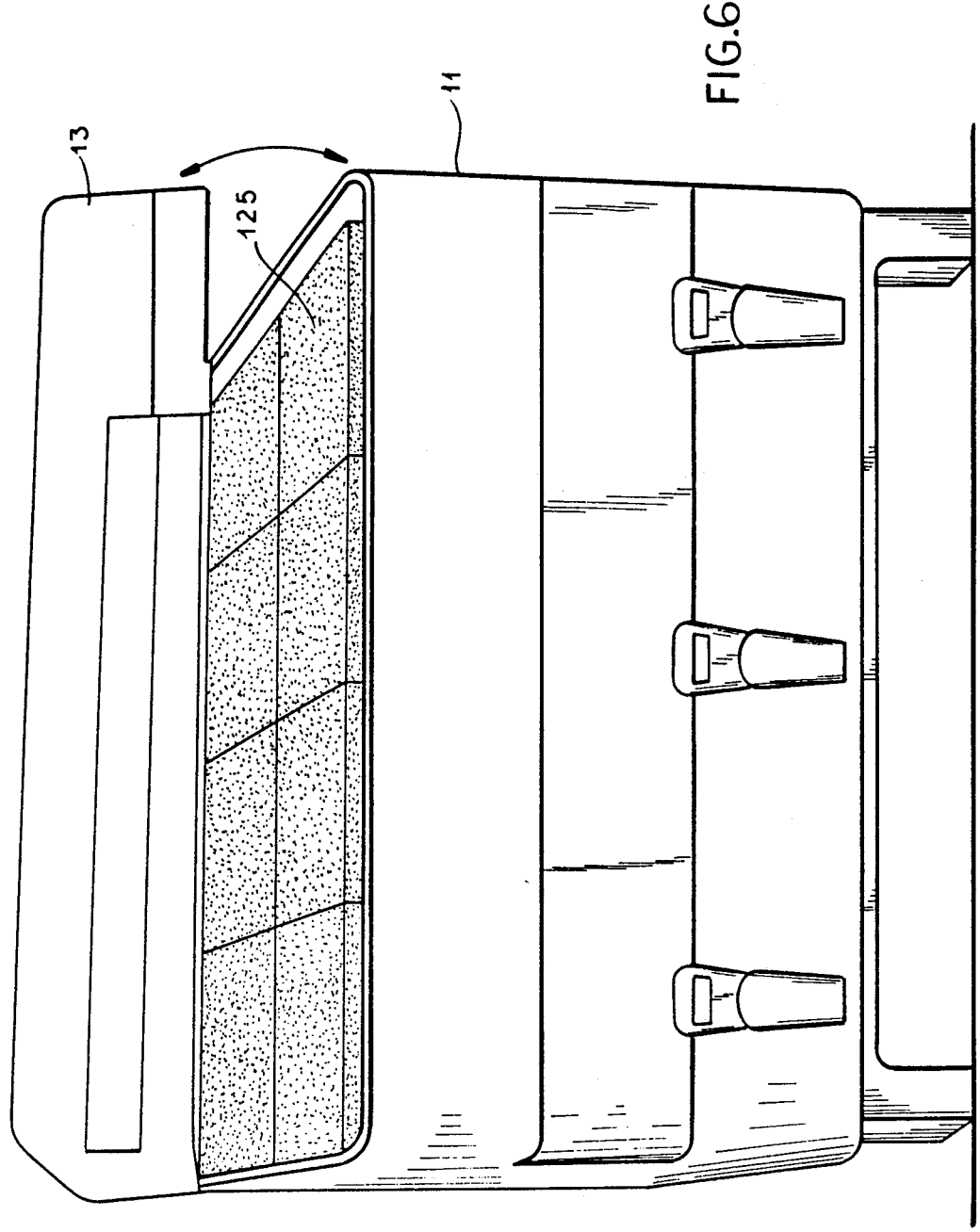

4,967,648

AUTOMATIC INFUSION-BEVERAGE APPARATUS

CROSS REFERENCE TO RELATED APPLICATION

This application is a continuation-in-part of my copending application Ser. No. 07/218,107, filed July 12, 1988, now U.S. Pat. No. 4,858,523 issued Aug. 22, 1989.

FIELD OF THE INVENTION

My present invention relates to a user-friendly apparatus for the automatic making of infusion beverages, especially coffee and, more particularly, to an automatic coffee-brewing apparatus which is particularly intended for institutional, restaurant and like use where frequent brewing of fresh batches of the infusion beverage may be required.

BACKGROUND OF THE INVENTION

In my U.S. Pat. No. 3,872,781, I have described an infusion apparatus, namely, an automatic coffee brewer in which a fresh water reservoir was connectable with a plurality of coffee-brewing compartments through a distributor utilizing a pump arrangement and has a brewed-coffee reservoir into which the brewing compartments discharged to enable the brewed coffee to be dispensed.

It is known, moreover, to provide such apparatus with a timer for initiating a brewing cycle at a given point in time so that, for example, a pot of brewed coffee will be available to the user in the morning without any preparatory steps by such user before the beverage is prepared on that day. Indeed, with the development of more sophisticated user-friendly apparatus for the brewing of coffee, systems have been proposed which incorporate coffee grinders as well as systems for the production of a variety of infusion beverages in a single machine.

The various apparatuses which provide for sequence control of a number of steps and procedures which can be selected by the user have not generally been made available for use in coffee shops, diners and restaurants, i.e. for commercial or institutional beverage production. Moreover, there is a need for an apparatus which can substantially automatically produce large amounts of infusion beverages in succession for locations of high demand and without the need for an operator determination as to when the brewing of a fresh batch may be required.

It is important, moreover, for restaurant use, for use in convenience stores where infusion beverages like coffee may be continuously produced and in like applications to be able to supply a variety of infusion beverages, especially decaffeinated coffee and regular or nondecaffeinated coffee as well as hot water for tea as demand arises and, in particular, to freshly brew infusion beverages when such need arises.

OBJECTS OF THE INVENTION

Accordingly, it is the principal object of the present invention to provide an apparatus for the automatic production of large quantities of an infusion beverage so that a fresh product can be continuously dispensed with a minimum of human intervention.

A more specific object of this invention is to provide a machine for the brewing of coffee for commercial and institutional purposes which will be free from any of the drawbacks of commercial machines which are now available.

Still another object of this invention is to provide an automatic apparatus for the preparation of infusion beverages which has greater versatility than earlier machines for home or commercial purposes.

A further object of my invention is to extend the principles of the above-identified copending application and, especially, to be able to provide a plurality of different brewed beverages which can be prepared as need arises and independently of one another in one and the same machine.

SUMMARY OF THE INVENTION

These objects and others which will become apparent hereinafter are attained, in accordance with the present invention, which provides a machine for the automatic production of infusion beverages, especially a coffee-brewing machine which has a distributor connected to a heated-water source and selectively communicating with an array of coffee-brewing compartments, each having a filter containing a premeasured batch of the infusion substance, e.g. ground coffee, and a plurality of collectors into which the infusion beverage, i.e. the brewed coffee can flow from the coffee-filter unit.

According to the invention, the heater-water source and the distributor are connected to a microprocessor controller capable of sequencing the distributor to communicate with the array of filters. Preferably a further distributor is provided downstream of the coffee filter unit to deliver the infusion beverage selectively to one of a plurality of carafes or serving pots and, if desired, a tank.

According to an important feature of the invention, the filter unit is a prepackaged structure preformed with the filters, e.g. molded in a single piece, which contain the premeasured amounts of the infusion substance and in which the filters are provided in a rectangular array, i.e. in parallel rows of spaced-apart filters.

Specifically, therefore, the automatic apparatus for making infusion beverages of the invention can comprise:

a housing;

means in the housing for supporting a unit comprised of a plurality of filters each receiving a predetermined quantity of a comminuted substance to be infused with hot water to generate a beverage;

a distributor in the housing communicating selectively with the filters for delivering heated water thereto;

a source of heated water connected to the distributor;

a plurality of collectors for receiving beverage from at least some of the filters and dispensing the received beverage; and a microprocessor controller connected to the source for supplying water to the distributor upon an instruction to the source from the microprocessor controller for generation of a beverage at a selected one of the filters, connected to the distributor for connecting the distributor to the selected one of the filters to deliver the heated water thereto upon an instruction to the distributor from the microprocessor controller, and connected further to the means communicating with the collectors for selectively dispensing the brewed products thereto.

The packaged-filter unit, moreover, may be provided with indicia, e.g. a bar code, which can be read by a bar-code reader in the housing of the apparatus when the filter unit or packages are inserted, to thereby signal to the microprocessor controller, the amount of coffee or other infusion substance in each filter or brewing compartment, thereby enabling the microprocessor to respond and regulate the amount of water required to generate a particular infusion beverage from that compartment.

Preferably the housing is in the form of a rectangular parallelepiped having a lower portion provided with the collector and receiving the filter package and an upper portion or cover which may be hingedly mounted on the lower portion and can be swung back to allow replacement of the filter package. In this case, the cover portion will contain the distributor and all electronic parts, to avoid any water damage and allow the top to be quickly replaced in case of failure by a service person. The defective control center then can be repaired at the factory, or local service shop, or coffee distributors that supply restaurants, etc.

Of course, the filter unit can be a tray formed with the aforedescribed array of filter or brewing compartments and which may be removed from the machine for insertion into the latter as a unit with premeasured amounts of coffee in the various filter compartments.

In that case, trays previously filled with measured amounts of coffee may be stocked and substituted for previously used trays as need arises or each tray may be filled prior to insertion into the machine by the user.

Important to the present invention is a plurality of calculators which can include the reservoir of my earlier application for the storage of large quantities of a particular beverage, say regular coffee, but can omit this reservoir so that the calculators themselves may be individual carafes or serving pots which can receive directly from the filter, i.e. without intervening storage, respective infusion beverages. For example, a number of pots may hold regular coffee while other pots may hold hot water and still other pots may hold decaffeinated coffee. In any event, at least two pots with different beverages are provided.

According to the invention, as the low level of a particular beverage is sensed, e.g. via a load cell individual to that serving pot, the microprocessor can actuate the distributor to cause the filter unit associated with that beverage to produce another pot. The filter unit may discharge directly into respective pots or a further distributor may be provided for directing the respective beverages into their assigned collectors.

The filter unit can be provided with a number of filter pockets for each of the types of beverages produced although, preferably, I provide a plurality of filter units each having a multiplicity of filter pockets and individual quantities of the substance to be transformed into the infusion beverage.

The sensor of the earlier application signalling depletion of the filter unit can be provided for each filter unit in this case.

The fact that the apparatus is controlled by a microprocessor greatly increases its versatility over earlier machines for the brewing of coffee. For example, I can provide a flow sensor connected to the source of heated water for monitoring the amount of water fed by the source. That flow sensor is connected to the microprocessor controller which, in turn, can control a solenoid valve cutting off such flow when the desired amount of water has been supplied. The flow sensor, like all of the sensors which will be described, can be of the analog type, connected to the microprocessor through an analog-to-digital converter.

The collector can be a funnel means under a plurality of brewing compartments receiving the brewed beverage from the array of outlets thereof and delivering the brewed beverage to a reservoir in the base or bottom portion of the housing. The reservoir, of course, can have a plurality of outlet spigots from which the coffee may be discharged. Of course, the housing may be provided with a discharge cock or spigot allowing the dispensing of hot water or another infusion beverage under the control of the microprocessor when a switch on the housing is triggered, e.g. for serving tea, hot chocolate or soup, if desired.

However the collectors should always include a plurality of carafes, serving pots or the like which can be refilled from the filter unit or units. The individual carafes can be filled independently of the tanks and with respective different brewed beverages, e.g. decaffeinated or regular coffee.

According to a feature of the invention, a reservoir sensor is provided to respond to the level of the beverage in the reservoir or the collectors generally can have such sensors and the sensors can be connected to the microprocessor so that the microprocessor can initiate a fresh brewing cycle whenever the level of the beverage reservoir in one or another of the collectors falls below a predetermined level.

Still another feature of the invention resides in the formation of the reservoir sensor as a load cell or like member responsive to the weight of the reservoir and its contents.

The reservoir may be thermally insulated to minimize losses of heat from the beverage and can be provided with a cover preventing evaporative heat losses therefrom, the cover opening to permit entry of the brewed coffee from the funnel means and being self-closing.

A temperature sensor may be provided to respond to the temperature of the beverage in the reservoir and/or the other collectors and can be connected to the microprocessor so that the output of the latter can control a heater in heat-exchanging relationship with the beverage in the reservoir.

Another sensor with which the microprocessor may be supplied with an input is a sensor for the position of the distributor, i.e. a sensor for the funnel with which the distributor is in communication, the distributor being driven by a motor controlled by the microprocessor. The distributor, if any, supplying the collectors can likewise be provided with such sensors.

Inputs to the microprocessor under control of the operator may be supplied by a keyboard on the housing or by function keys substituting for the keyboard or in addition thereto for specific function control. The housing may also be provided with a display for the particular state of operation or mode of operation of the apparatus.

BRIEF DESCRIPTION OF THE DRAWINGS

The above and other objects, features and advantages of the present invention will become more readily apparent from the following description, reference being made to the accompanying drawing in which:

FIG. 4 is a perspective view of the coffee brewing machine according to the invention;

FIG. 6 is a view similar to FIG. 4 with the cover partly raised;

SPECIFIC DESCRIPTION

Figure 1:
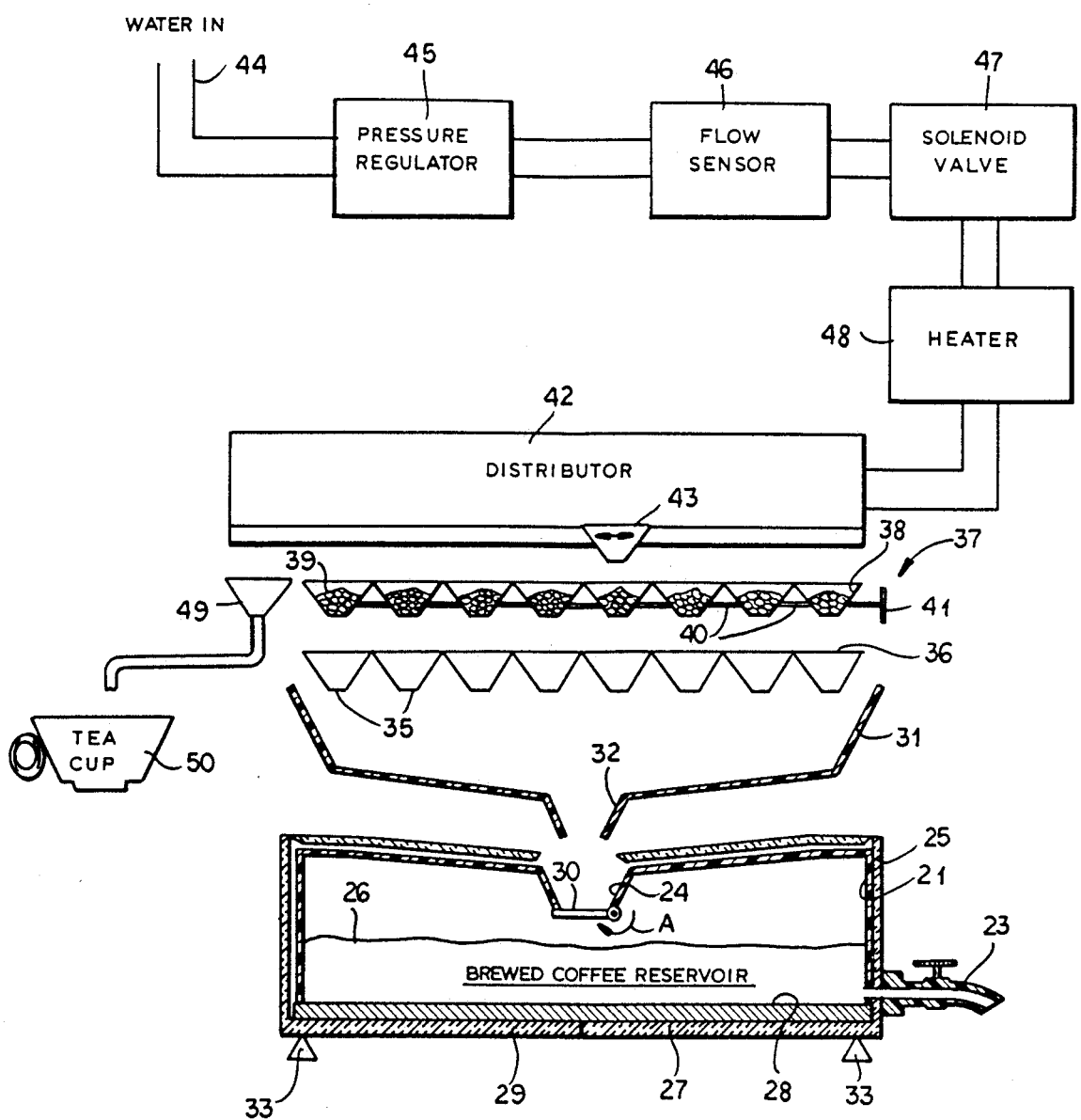
FIG. 1 is a diagram illustrating principles of the invention.

The coffee brewing apparatus of the invention can comprise a rectangular parallelepipedal housing 10 which comprises a base or lower portion 11 mounted on feet 12 so as to be able to stand on a counter top or the like and a cover or lid 13 which is swingably mounted upon the lower portion 11 by a hinge 14 so that this cover may be swung upwardly as can be seen from FIG. 6.

As is also apparent from FIG. 4, the lower portion of the coffee brewing machine has three spigots 15, 16 and 17 with respective handles 18, 19, 20 which, when drawn forwardly toward the viewer, can cause brewed coffee to be dispensed from a reservoir 21 better seen in FIG. 1.

The amount of brewed coffee in the reservoir is visible through a Pyrex window 22 (FIG. 4).

Referring now to FIG. 1 which diagrammatically illustrates an essential structure of the brewing apparatus within the housing 10, it can be seen that the reservoir 21, which can have a transparent wall registering with the window 22 and not visible in FIG. 1, has an outlet 23 which symbolically represents any one of the spigots 15-17.

The reservoir 21 is sheathed on all of its other surfaces with the exception of an inlet opening 24, with thermal insulation 25 designed to minimize the loss of heat from an infusion beverage 26 such as brewed coffee contained therein. Between the insulation 27 on the underside of the reservoir and the wall 28 thereof, a plate-type resistive electrical heater 29 can be provided to heat the contents of the reservoir.

The inlet 24 of the reservoir 21 is provided with a spring-loaded door 30 which is braced upwardly in the direction of the arrow A by its spring, which is not visible in the drawing, so that the reservoir is normally held closed to thereby prevent losses of heat from the beverage in the reservoir by evaporation therefrom.

The collector of the apparatus is formed by a funnel 31 whose outlet 32 communicates with the inlet 24. When brewed coffee is led to the inlet 24 by the funnel 31, the weight of the incoming beverage swings the door 30 downwardly to allow entry of the brewed coffee into the reservoir. The reservoir may be supported by load cells 33, represented diagrammatically in FIG. 1 and forming a reservoir weight sensor 34 which will be referred to subsequently in connection with FIG. 2. The funnel means 31 of the collector formed by it and the reservoir 21, should span the outlets 35 of the entire array of brewing vessels 36 positioned in the housing above the funnel 31.

The brewing vessels 36, which have been shown diagrammatically in FIG. 1 serve as a support for a previously prepared filter unit diagrammatically illustrated at 37 in this Figure and which will be described in greater detail with reference, for example, to FIGS. 9 and 10.

In the preferred or best-mode embodiment of this invention, the unit 37 is a package consisting of the filter structure with a plurality of frustoconical filter compartments analogous to those of a drip-coffee maker, formed in one piece from a filter material or as separate filter elements joined together in the filter unit and packaged for all distribution and solely with premeasured amounts of the infusion substance in each filter element.

Alternatively, as will be described, the filter unit may be a tray with permanent filters formed thereon and which may be replaceable as a unit in the machine after the tray has been filled outside the machine with premeasured amounts of the infusion substance, e.g. ground coffee.

By way of example, the unit 37, which can be referred to as a coffee-containing preform, consisting of cups 38 of the filter material which are permeable to water and the beverage, containing the premeasured amounts 39 of ground coffee and bonded into a preform by webs 40 of the filter material, paperboard, cardboard or a synthetic resin material and, if necessary, provided with a bounding frame or rigid structure 41 which renders the structure sufficiently stiff t enable it to be inserted into the brewing machine as a unit and removed therefrom as a unit.

What is important to the present invention, whether a coffee preform is used or the replaceable unit consists of a tray as described, is that the unit comprises a plurality of linear rows of the coffee-containing filter pockets.

Above the coffee preform or filter unit 37 is a diagrammatically illustrated distributor 42 for hot water, the distributor here being shown to have a linearly displaceable outlet 43, representing a movable element of the distributor.

In practice, the distributor of the invention preferably has a moving element whose position determines the particular filter pocket with which the distributor is in active communication at any particular time, the distributor being connected to the microprocessor controller as will be described. Suffice it to say for the present that the distributor 43 can selectively communicate with pockets 38 to feed hot water to the pocket so that an infusion beverage is formed therein by the drip process, the beverage being collected in the funnel 31 of the reservoir 21.

The distributor 42 receives hot water from a source represented at 44 and constituting a cold-water line of the establishment in which the machine is installed.

Preferably, this cold-water line is connected in series with a pressure regulator 45, a flow sensor 46 which is connected in turn to the microprocessor controller, a solenoid valve 47 controlling the amount of hot water delivered to the distributor and under the control of the microprocessor controller and a demand heater 48, likewise under control of the microprocessor controller for heating the water before it reaches the distributor.

The pressure regulator 45 is not required but has been found to be useful because it enables the brewing apparatus to operate more reliably and without sensitivity to fluctuations in line pressure.

The water-supply line may be a municipal line and may have any desired pretreatment equipment connected therein. Typical pretreatment devices include filters, water softeners or the like. Such equipment is only necessary if the water which is to be used for brewing the coffee is not of sufficient quality.

The pressure regulator 45 may be of the ordinary mechanical type having a valve coupled to a pressure-sensing diaphragm and used to maintain a substantially constant pressure in water lines generally.

The flow sensor 46 may be any conventional flow sensor and because it may be desired to connect the flow sensor directly to the microprocessor of the controller, it may have a typical output. Of course, an analog flow sensor may be used provided that the output of the flow sensor is fed to an analog-to-digital converter which, in turn, feeds the microprocessor of the controller.

The flow sensor 46 may be any conventional flow sensor and because it may be desired to connect the flow sensor directly to the microprocessor of the controller, it may have a digital output. Of course, an analog-flow sensor may be used provided that the output of the flow sensor is fed to an analog-to-digital converter which, in turn, feeds the microprocessor of the controller.

A flow sensor which may be used, in accordance with the invention, is of the type having a paddle wheel or rotor driven by the water flow and causing rotation directly or indirectly of a rotating assembly such as a wheel or disk having a number of magnets at its periphery which may sweep in succession past a magnetic-field detector such as a Hall effect sensor. The output of this sensor can be amplified and processed as required to form the input to the microprocessor controller.

The solenoid valve 47 Which may be used can be any conventional electromagnetically operated valve and preferably is of the bistable type, i.e. is completely on or completely off depending upon whether it is energized electrically or not. Electrically operated proportionally controlled valves may be used instead as desired.

The demand-type heater 48 is an electrical heater with enough heating capacity to ensure that the water at the heater output can be maintained at a particular temperature. The heater is a tankless-type heater and a feed-back arrangement may be provided in the control system as will be described from a heater temperature sensor which may detect the water temperature at the heater output and provide a corresponding input for the microprocessor controller to enable the latter to adjust the heating rate of the demand heater accordingly.

In operation, when the microprocessor controller determines that the level of brewed coffee in the reservoir 21 has fallen to the point that an additional quantity of brewed coffee should be added to that reservoir, the distributor is activated to step up output to a coffee-containing pocket 38 which has not yet been supplied with the hot water whereupon the solenoid valve 47 is opened and water is permitted to flow to the distributor, being heated by the demand heater 48.

When the flow sensor has indicated that a measured quantity of water equal to that necessary to form the beverage of proper strength has been supplied, its signal to the microprocessor controller causes the latter to shut off the solenoid valve.

The brewed Coffee collected in the vessel 31 flows past the door 30 into the reservoir 21 and is dispensed in the usual manner. An input to the distributor, generally from the microprocessor controller, can shift the output of the distributor to a line 49 which may dispense hot water into a teacup 50.

Figure 2:
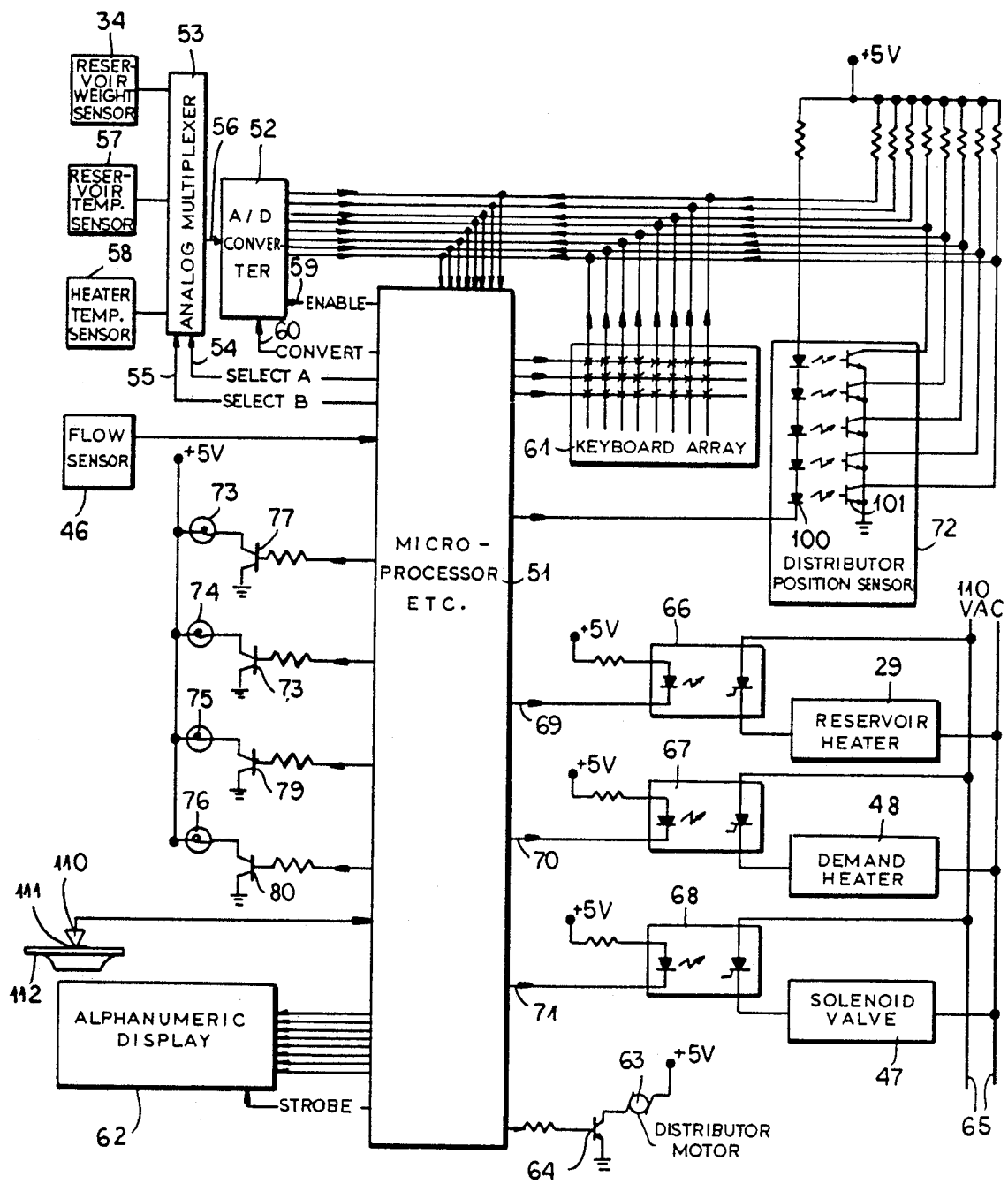
FIG. 2 is a block diagram of the microprocessor controller of the apparatus shown in FIG. 1.

Turning now to FIG. 2, where the microprocessor controller is shown in block diagram form but in greater detail, it will be apparent that the heart of the controller is a microprocessor 51 which can be programmed by the usual techniques involved in firmwear programming and which can be of any desired level of complexity and can be associated with memories or registers as may be required for storage of any information which the microprocessor must retain.

The inputs to the microprocessor controller include an input from the flow sensor 46. This input may be a direct input when the flow sensor 46 has a digital output. Where the flow sensor 46 has an analog output, it may be multiplexed to an analog-to-digital converter 52 servicing the microprocessor 51. For this purpose a multiplexer 53 can be provided and has select lines 54 and 55 as well as an output 56 running to the analog-to-digital converter 52. The multiplexer receives inputs from the reservoir weight sensor 34 previously described, from a reservoir-temperature sensor 57 which has not been shown in FIG. 1 but is provided within the reservoir 21 to measure the temperature of the beverage therein, and from the heater temperature sensor 58 previously mentioned but not illustrated and located at the downstream end of the demand heater 48.

The multiplexer commutates all of these inputs in a cyclical manner to the microprocessor through the analog to the digital converter which is provided with enable and convert signals 59 and 60.

Additional inputs to the microprocessor derive from a keyboard or switch panel assembly which has been represented at 61. Such control ports for the programmed apparatus firmwear are well known in the art and allow programming of the microprocessor, and/or the inputting of information or instructions.

Outputs from the microprocessor controller are supplied to an alphanumeric display 62, to a distributor motor 63 driving the distributor and through a control circuit which has been simplified by its representation as a single transistor 64.

Since the reservoir heater 29, the demand heater 48 and the solenoid valve 47 are high-power devices which may be operated by line current supplied at 65, solid state relays of the isolating type are provided at 66, 67 and 68 to isolate outputs 69, 70 and 71 of the microprocessor from the line current circuits. These relays may use optical isolators as depicted and SCR circuitry to control the line current power. Another set of inputs to the microprocessor derive from the distributor-position sensor here represented at 72 and also illustrated to be of the contactless or optical type utilizing LEDs and phototransistors.

The control scheme provided by this circuit will be evident from the preceding description. The reservoir weight sensor 34 through the microprocessor 51 controls the operation of the solenoid valve 47 so as to enable the opening thereof when the beverage level in the reservoir falls while the flow sensor 46 controls the solenoid valve through the microprocessor 51 to close the valve when the desired quantity of water has passed. The reservoir temperature sensor 57 controls the reservoir heater 29 through the microprocessor 51 and the heater temperature sensor 58 controls the demand heater 48 through the microprocessor.

The distributor-position sensor 72 supplies the microprocessor with signal indicating the position of the distributor so that the distributor can be properly positioned at the coffee-containing pockets as desired and the status may be signaled via indicator lamps and drivers 73, 74, 75, 76, etc. from outputs of the microprocessor controller 51 through respective amplifier circuits 77, 78, 79 and 80, represented as simple transistor circuits. The status of the apparatus is displayed on the alphanumeric display 62.

Figure 3C:
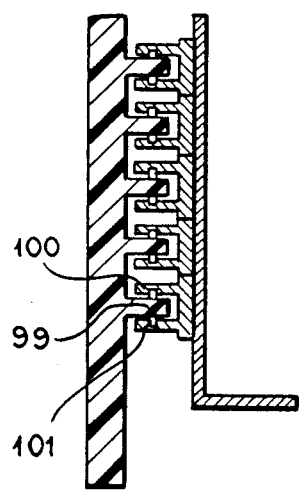
FIG. 3C is a detail cross sectional view drawn to a larger scale of the position sensor assembly of FIG. 3A seen in section along the line IIIC—IIIC of FIG. 3A.
Figure 3A:
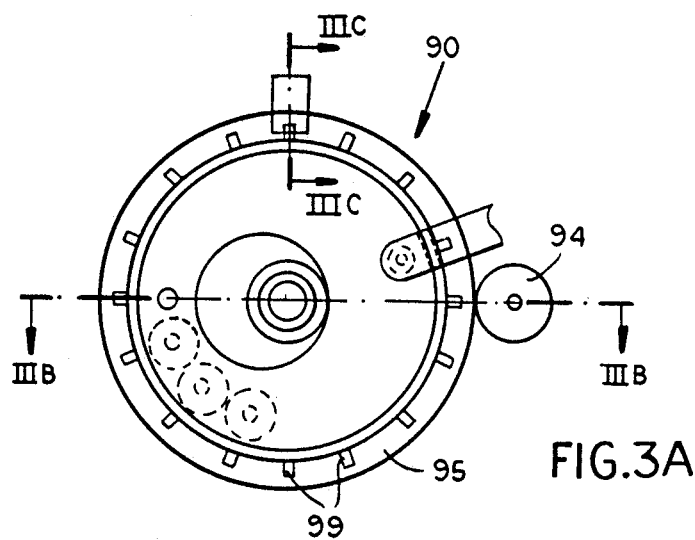
FIG. 3A is a diagrammatic elevational view of a distributor.
Figure 3B:
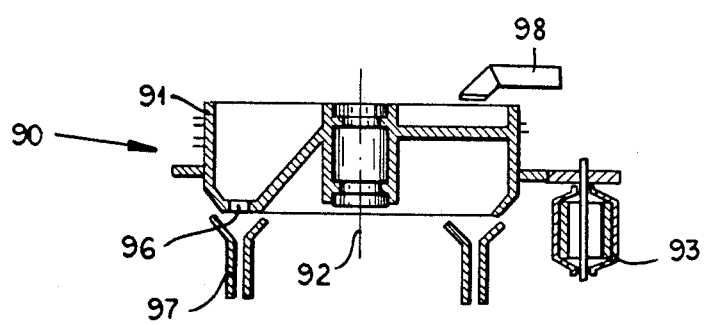
FIG. 3B is a section taken along the line IIIB—IIIB of FIG. 3A.

While, as noted above, the distributor can be any apparatus controllable by a microprocessor controller for distributing the hot water to the rectangular array of coffee-containing filter pockets as has been described for the diagrammatically illustrated distributor 41 of FIG. 1, I have found it to be advantageous to provide a rotary distributor of the type which has been illustrated at 90 in FIGS. 3A, 3B and 3C. This distributor comprises a distributing cylinder 91 which is rotatable about an axis 92 by a motor 93, if desired via a transmission formed by a drive gear 94 and a driving gear 95, the latter being a ring gear formed on the distributor cylinder.

The distributor cylinder 91 has a single outlet 96 which can be successively aligned with a plurality of tubes 97, each extending to a location directly above a respective one of the filter pockets 38. The distributor mechanism illustrated in FIGS. 3A-3C may be mounted in the cover of the apparatus as will be described in greater detail hereinafter.

A water inlet 98 is connected through the solenoid valve 47 and the heater 48 to the source 44 of the cold water under pressure. The motor 93 of the distributor will, of course, correspond to the motor 63 shown in FIG. 2 under the control of the microprocessor controller 51.

The distributor position sensor 72 may comprise a plurality of coding fingers 99 angularly equispaced on the wall of the brewing vessel and, as shown in FIG. 3C in a vertically-spaced relationship so that these fingers can be interposed between the light-emitting diodes 100 and the phototransistors 101 of the stack of LEDs and phototransistors forming the sensor 72 so that depending upon the number of light paths interrupted by these fingers, the appropriate signals are transmitted to the microprocessor controller 51 to indicate when the outlet of the distributor is aligned with the tube connected to the brewing vessel associated with the particular set of coding fingers.

The operation of the hot-water distributor 90 illustrated in FIGS. 3A-3C should immediately be apparent.

With the arrangement shown there are five sets of light-emitting diodes and phototransistors forming the position-sensor arrangement 72 so that there are a variety of combinations of omitted or present fingers 99 for signalling, utilizing a binary code for the 16 positions of the distributor. The fingers, which can selectively be broken off, are molded into or attached to the rotating wall of the distributor.

In the embodiment of the distributor illustrated, the 16 positions, each corresponding to a tube 97 connected to a brewing vessel or to the hot-water output, can service 15 brewing vessels which can be provided in three rows of five brewing vessels each or in some other array of linear rows of the brewing vessels. The 16th position, of course, represents the hot-water outlet.

The fifth LED-phototransistor pair and the tabs or fingers which are associated therewith can be used to signal to the computer, as with an interrupt, that the distributor is in a proper position for delivering a code to the microprocessor controller. The tab or finger associated with the fifth sensor pair can be smaller than the coding tabs. With this arrangement, the controller can unambiguously be signalled when an proper code set of tabs or fingers is in place.

The microprocessor 51 can activate the sensor 72 through the outlet line from the microprocessor connected thereto. The LEDs are all connected in series and are simultaneously illuminated therefore, under the control of the microprocessor.

With the circuit arrangement shown in FIG. 2, the A/D converter, the keyboard-array scanner and the distributor-position sensor all can share the same microprocessor input port, the microprocessor ensuring that only one of these systems is active at any given instant.

While 16 distributor positions have been found to be advantageous, it should be clear that additional positions or fewer positions may be used as required and that some other coding system utilizing holes, notches, reflectors, magnets or the like with optical, touch and magnetic sensors as may be desirable, can be substituted for the optical sensors and the interrupting coding fingers.

Furthermore, while I prefer to use a mechanical distributor of the type which has been described or will be described, it should be apparent that a solid state distributor may be employed in which the microprocessor, properly programmed, selectively activates respective solenoid valves connected to the various tubes running to the brewing vessels.

FIG. 2 also shows in very diagrammatic form the relays 66-68 which represent commercially available solid-state relays. These devices utilize an encapsulated thyristor capable of controlling the flow of very high currents and utilizing a control circuit operating at low voltage to activate a LED which through conventional circuitry controls the thyristor. The optical isolation provided allows isolation of the control circuitry from the high voltages and currents of the line current source and the high current or power items which are controlled by the relays.

The alphanumeric display 62 is also commercially available and is provided to supply information to the operator of the coffee brewing machine. By operating appropriate dedicated buttons or activating the keyboard, the oscillator can input information to the microprocessor so that the latter will display the temperature of the coffee in the reservoir, the number of cups of coffee remaining available in the reservoir, the number of cups of coffee available form the unbrewed coffee in the preform, the set-point temperature for the brewing water and like information.

In addition, the microprocessor will contain an internal digital clock so that the present time may be displayed at the alphanumeric display 62 at all times when other information is not displayed and other time-regulated information can be called up or set so that the operator can, if necessary, preprogram the machine to brew a certain number of cups of coffee to be available at a later time when the rush in service may prevent the operator from initiating operation of the machine. Thus the machine can be prepared for the rush hours in the morning and afternoon which the restaurant may experience.

Of course, the microprocessor may be programmed to display also any necessary prompts for the operator vis-à-vis the operation of the machine and any malfunction codes or information.

The indicator lamps and drivers 73–76 merely represent lamps which turn on and off to assist the operator in operating the machine. The lamps may be button-illuminating lamps or the like.

It is important to bear in mind that the machine as thus far described can be provided to allow successive operation of the brewing vessels so that each brewing vessel is completely emptied before hot water is admitted to the distributor for the next brewing cycle or the brewing cycles can be overlapped so that as soon as the distributor empties water into one of the brewing vessels, the distributor is switched and immediately feeds water into another brewing vessel so that two or more brewing vessels may discharge coffee into the reservoir in an overlapped manner.

As is also apparent from FIG. 2, the microprocessor 51 may have an input from a bar-code reader 110 which cooperates with indica 111 on a portion of the coffee preform 112, e.g. in the form of a bar code, so as to signal to the microprocessor information as to the amount of ground coffee in each filter packet and thereby control the quantity of water which is fed to each brewing vessel and coffee filter. This enables a single machine to service various sized filter packages so that smaller and larger units of prepared coffee can be made in each brewing cycle.

Turning now again to FIG. 4, it can be seen that the cover 13 can be provided with the alphanumeric display 62 as well as a number of push-buttons 113–124 which may be earmarked for various functions with appropriate inputs to the microprocessor controller. These push-buttons can be illuminated with lamps such as those shown at 73–76 when operated and, of course, may be provided in addition to a number-pad-type keyboard or as a substitute therefor. For example, the push-button 113 may be a START button to begin the brewing process. Push-button 114 may be a STOP button for halting the brewing process.

The push-button 115 may be an AUTOSET button to set a particular pattern of operation of the machine in motion based upon information stored in the microprocessor controller. The push-buttons 116–118 may input HOUR, MINUTE and SECONDS for setting the time of day and the push-button 119 may serve to set the machine for the number of brewing cycles to be performed in a given period of time or may be used to step the machine to a particular brewing vessel or filter pocket. In the embodiment illustrated in FIGS. 4–6, an eight-filter pocket machine has been illustrated and the push-button 119 is represented as "1–8".

Push-buttons 120 and 121 may represent SELECT and TIME setting-instruction push-buttons while push-buttons 122–124 may be used for manual-operation inputs and status check.

Figure 5:
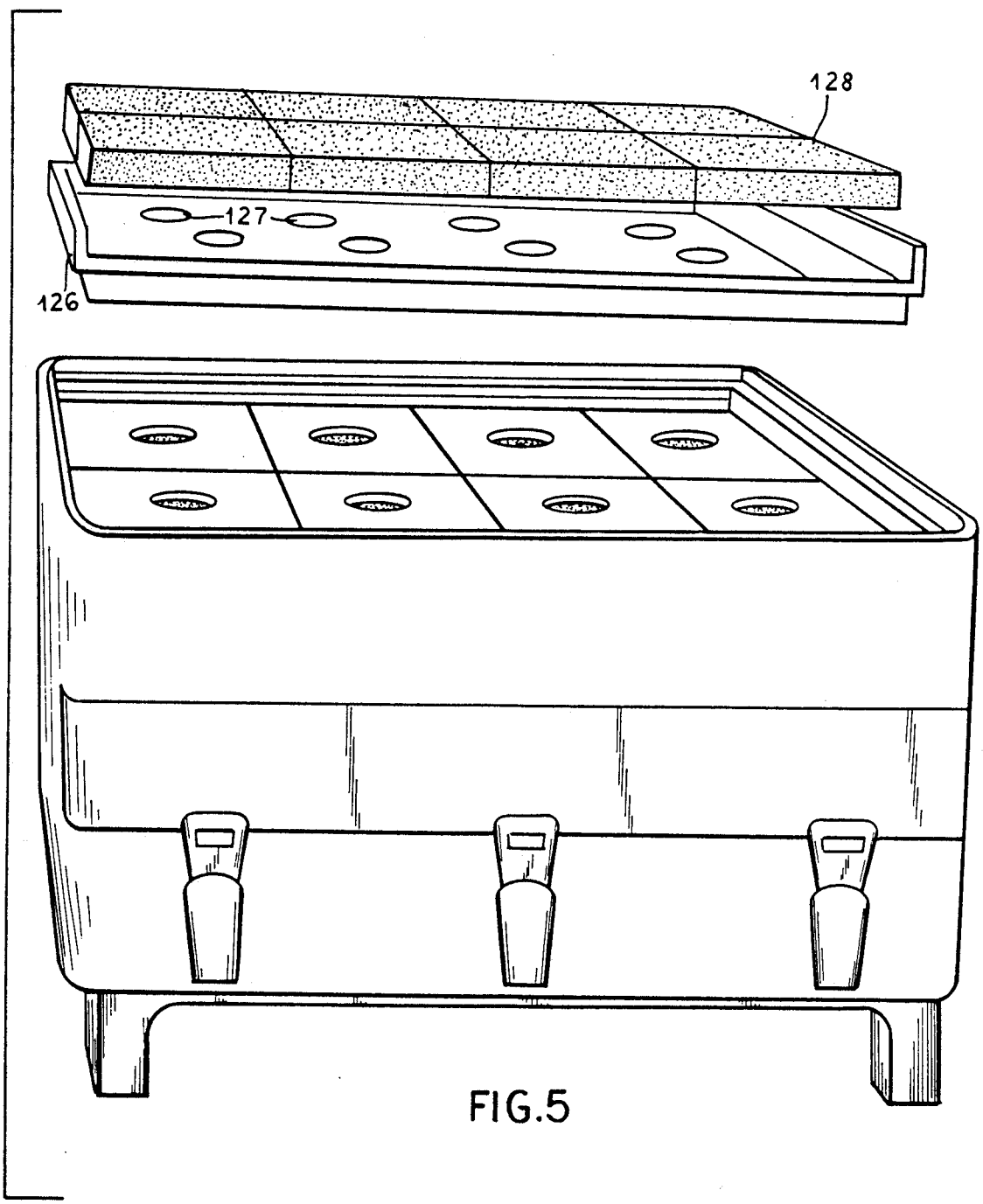
FIG. 5 is an exploded view, also in perspective form and highly diagrammatic in nature, representing a particular embodiment of the coffee brewing machine.

As can be seen from FIG. 5, the cover 113 may be swung upwardly from the bottom portion 11 of the housing to afford access to the preformed coffee filter unit, here represented at 125 and seen to have eight-filter pockets. The preformed coffee filter 125 may be a shaped body formed from filter paper and prepackaged with the coffee grounds.

Only a cover sheet of filter paper is visible in FIG. 6 over each of the pockets which may be frustoconical and downwardly convergent as has been shown in FIG. 1.

The preformed coffee filter 125 can be replaced by a metal holding tray 126 which has receptacles 127 into which individual filters may be inserted, each prepackaged with a measured quantity of coffee. Alternatively, individual filters can be provided in the receptacles 127 and filled with bulk ground coffee. In addition, the tray can receive the preformed coffee filter 128 if desired, the latter being entirely analogous to the filter 125 except that it is receivable in the metal tray 126.

Figure 7:
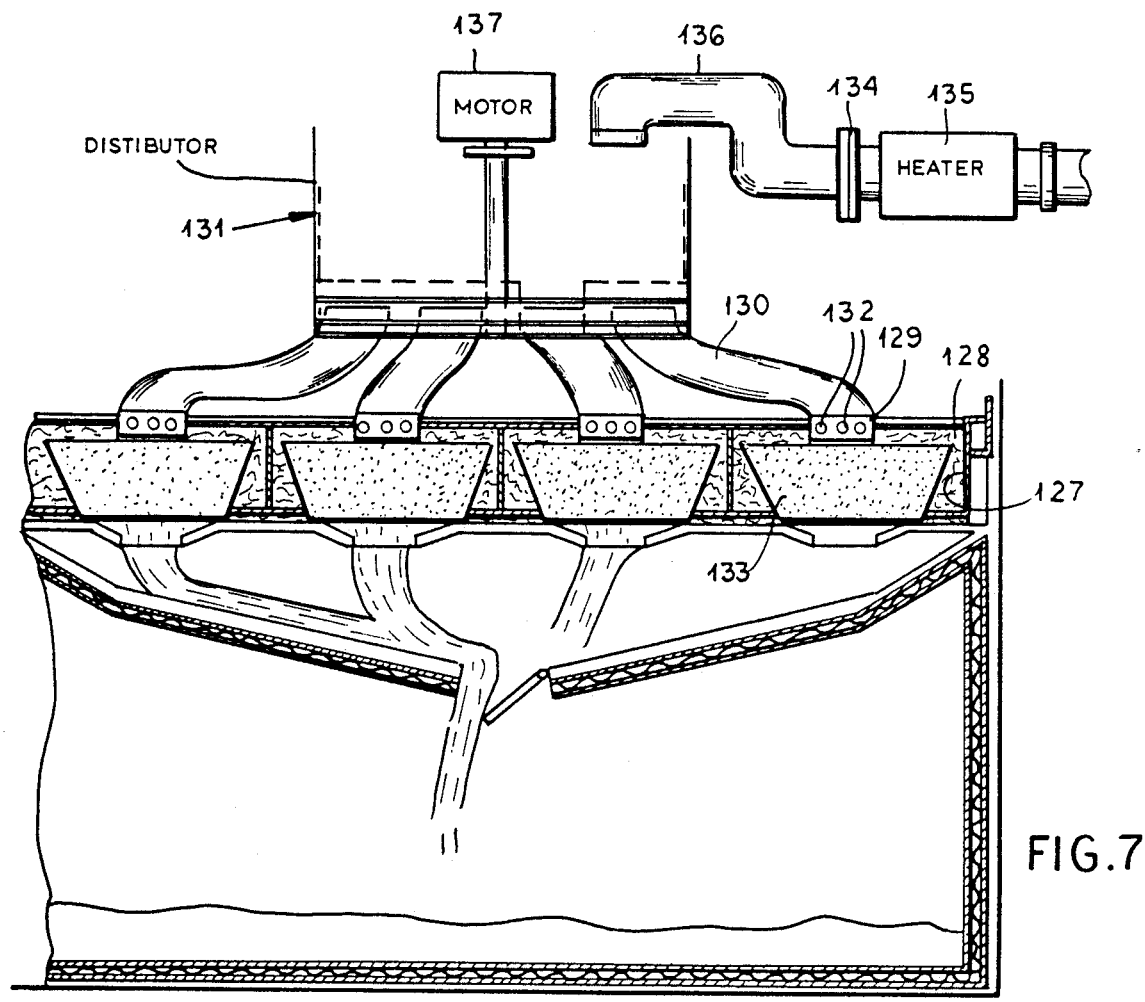
FIG. 7 is a diagram illustrating another distributor arrangement in accordance with the invention.

As is apparent from FIG. 7, the package 128 receivable in the metal tray 127 can be penetrated by downwardly projecting outlets 129 from the respective water delivery tubes 130 running from a distributor 131 of slightly different design from that originally described. The outlets 129 have radial orifices 132 enabling the hot water to flow into the coffee-receiving pockets 133 of the filter material. The balance of the prepackaged filter may be formed of paper or synthetic resin material.

Figure 8:
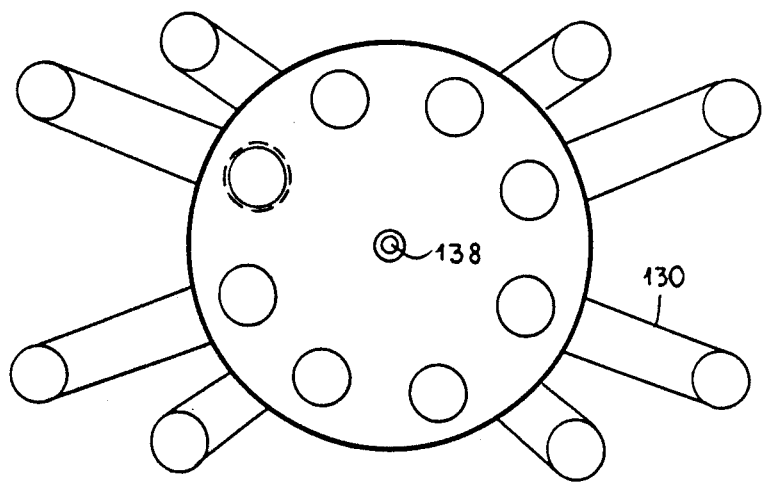
FIG. 8 is a diagram illustrating the delivery of the water to the eight-filter package of FIGS. 5-7.

In this embodiment, moreover, a flow meter or flow sensor 134, functionally analogous to the flow sensor 146 is provided downstream of the demand heater 135 in the line 136 running to the distributor 131 which is rotated by a motor 137 positioned along its axis. In this case, the tubes 130 all have their inlets lying along a circle centered on the axis 138 of the distributor as has been illustrated in FIG. 8.

Figure 9:
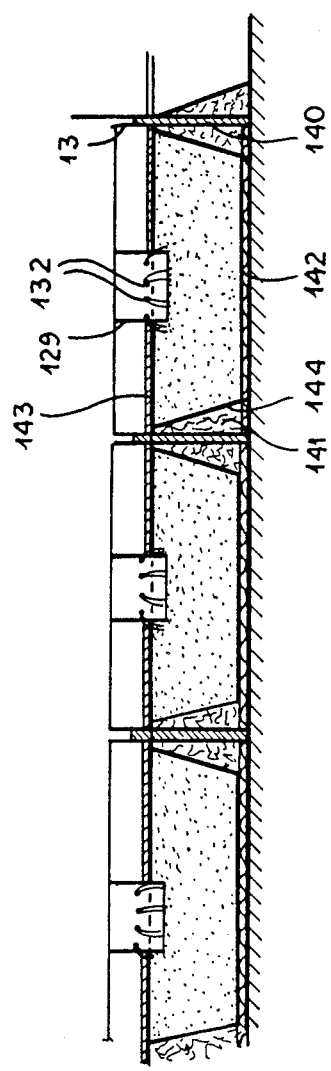
FIG. 9 is a cross sectional view of a prepackaged coffee-filter unit in accordance with the invention, partly in diagrammatic form showing its cooperation with the lid or cover of the machine.
Figure 10:
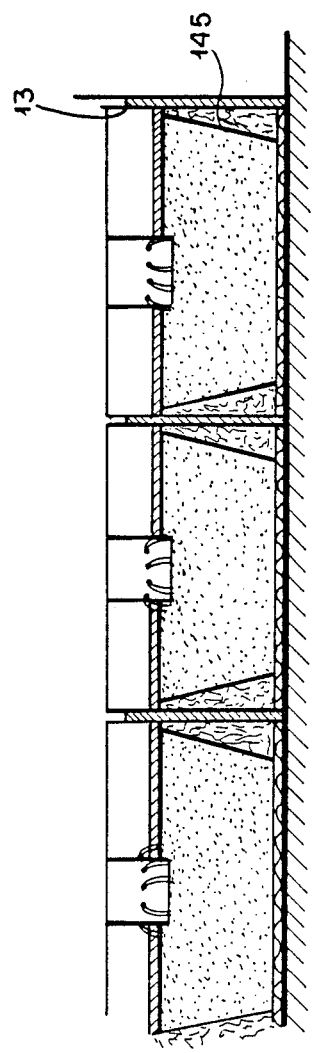
FIG. 10 is a sectional view similar to FIG. 9 illustrating the use of a refillable filter unit in place of the preferred prefabricated coffee filter of FIG. 9.

FIGS. 9 and 10 show two other arrangements of the filter package and refillable tray which may be used in the machine of FIGS. 4–6.

In the embodiment of FIG. 9 a prefabricated coffee filter is shown which comprises an aluminum-foil package 140 receiving filter material 141 of paper or the like and closed at the bottom with a fine-mesh screen 142. A paper layer 143 covers the top of each filter compartment, the aluminum foil partitioning the package into such compartments although the coffee-receiving pocket 144 therein has a frustoconical shape. In FIG. 9, the cover or lid 13 of a brewing machine has been shown, with the outlets 129 which empty via the apertures 132 through the filter-paper cover 143 into the particular coffee-containing compartment.

In the embodiment of FIG. 10, the metal tray is preformed with the frustoconical pockets 145 to receive the coffee filters and the respective quantities of coffee. In this case the lid or cover 13 will meet the top of the tray along the edge thereof.

Figure 11:
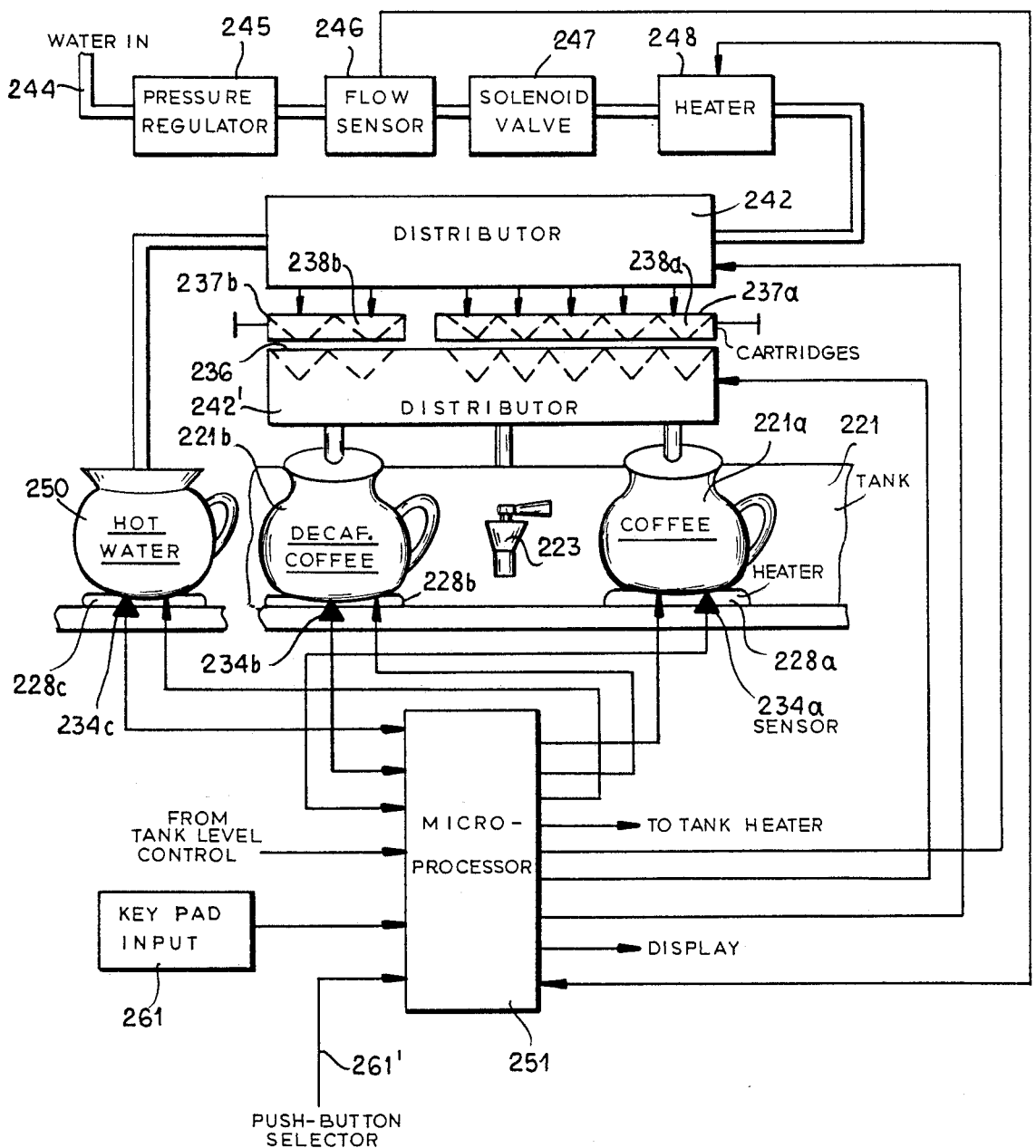
FIG. 11 is a view similar to FIG. 1 of another embodiment of the invention.

As can be seen from FIG. 11, the water can be delivered from a source 244 such as the normal municipal supply line to the regulator 24, flow sensor 246 and solenoid valve 247 as described in connection with FIG. 1, and the water can then flow to the heater 248. The flow sensor has an output which can be fed to the microprocessor 251 in a similar manner and the microprocessor can have an output to the heater 248 as has been described.

In this embodiment, however, two filter units or cartridges 237a and 237b are provided beneath the distributor 242 and can be formed with respective pockets 238a and 238b containing, for example, regular coffee and decaffeinated coffee grounds. The principle, of course, is the same as that which has been described in connection with FIGS. 1–10 and, of course, the respective filters can discharge into a funnel unit 236. The portion of the funnel unit 236 communicating with the decaf coffee filter unit 237b can communicate directly with a collector 221b for decaffeinated.

Similarly, the portion of the funnel unit 236 which receives the individual brewed quantities of coffee from the filter unit 237a can be supplied to the collector or serving pot 231a or to a reservoir 221 of the type shown at 21 in FIG. 1 and previously described. OF course, the reservoir may have a spigot 223 form which coffee pots can be filled for serving.

However, when a plurality of decaf coffee pots 221 and a plurality of nondecaf coffee pots 221a are provided, it may be advantageous to provide a second distributor 242' for feeding the brewed beverages selectively to the respective coffee pots. For this purpose, the microprocessor 251 has an output 299 to the distributor 242' so as to selectively step the latter to the proper outlet for the respective coffee pot.

The hot water pot 250 can be provided as well.

The reservoir 221 can be heated as has previously been described. Similarly each of the pots 221a, 221b and 250 can be provided with respective heaters 228a, 228b and 228c controlled by the microprocessor 251 so that these pots will be heated as long as they contain the respective beverages or water and as long as they are in place. Load-cell sensors can be associated with these containers as represented at 234a, 234b and 234c to signal the microprocessor that a particular pot requires refilling and that heating should continue. These sensors are analogous to the sensor provided for the reservoir in the embodiment of FIGS. 1–10. The microprocessor can have a tank level control 234, a key pot input 261 and push-button selector inputs 261' all as have been described previously.

Figure 12:
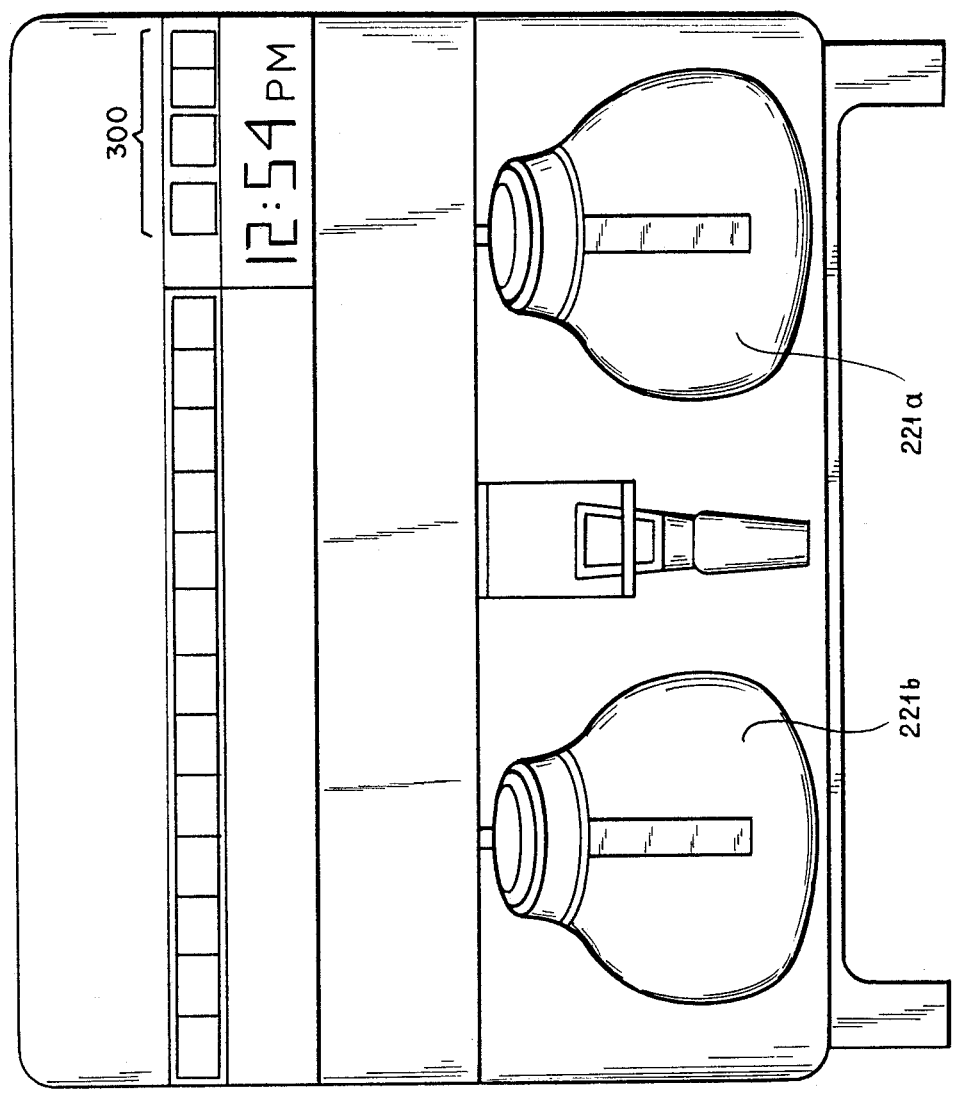
FIG. 12 is an elevational view generally similar to FIG. 4 of this latter embodiment.

In FIG. 12 I have shown a machine which is generally similar to that of FIG. 4 but wherein individual carafes 221a and 221b are supplied with regular coffee and decaffeinated coffee and the touch-sensitive keys of the earlier embodiment are enhanced by keys 300 for triggering the brewing of the respective beverages into the respective carafes independently of the reservoir filling. Access to the filter units by opening the top of the machine can be effected as has been described in connection with the earlier embodiment.

I claim:

1. An automatic infusion apparatus for brewing infusion beverages, comprising:
    a housing;
    means in said housing for supporting at least one unit comprised of a plurality of filters each receiving a predetermined quantity of a comminuted substance to be infused with hot water to generate a beverage;
    a distributor in said housing communicating selectively with said filters for delivering heated water thereto;
    a source of heated water connected to said distributor;
    a plurality of collectors for receiving respective beverages from at least some of said filters and dispensing the received beverage; and
    a microprocessor controller connected to said source for supplying water to said distributor upon an instruction to said source from said microprocessor controller for generation of a beverage at a selected one of said filters, and connected to said distributor for connecting said distributor to said selected one of said filters to deliver the heated water thereto upon an instruction to said distributor from said microprocessor controller.

2. The automatic infusion apparatus defined in claim 1 wherein said collectors are individual pots for dispensing different beverages, said apparatus including means for supporting a plurality of said pots and for individually heating same.

3. The automatic infusion apparatus defined in claim 1 wherein said unit is disposable, self-supporting, rectangular and comprises a plurality of linear rows of spaced apart filters each prepackaged with a respective quantity of tea or coffee.

4. The automatic infusion apparatus defined in claim 1 wherein said unit is a rectangular tray removably received in said housing and provided with a plurality of linear rows of spaced apart filter compartments each refillable with a respective quantity of tea or coffee.

5. The automatic infusion apparatus defined in claim 1, further comprising a pressure regulator connected to said source for regulating a pressure at which water is supplied to the apparatus, and a flow sensor traversed by water supplied by said source and providing an input to said microprocessor controller representing a quantity of water supplied by said source.

6. The automatic infusion apparatus defined in claim 1, further comprising a reservoir in addition to said collectors for receiving a beverage in addition to beverages supplied to said collectors and provided with a reservoir sensor responsive to the quantity of a beverage in said reservoir and connected to said microprocessor controller to enable said microprocessor controller to initiate a cycle of beverage preparation upon a decrease in the quantity of beverage in said collector to a predetermined level.

7. The automatic infusion apparatus defined in claim 1 wherein said collectors are provided with sensors constructed and arranged to respond to a weight of said collector and a quantity of beverage contained therein and connected to said microprocessor to initiate a cycle of beverage preparation.

8. The automatic infusion apparatus defined in claim 1 wherein said unit has an array of horizontally spaced-apart outlets from the respective filters for discharging a respective beverage and said collector comprises:
    a reservoir for dispensing a beverage contained therein; and
    funnel means below said array for collecting beverage from each of a plurality of said outlets and delivering beverage collected from each of said plurality of said outlets to said reservoir.

9. The automatic infusion apparatus defined in claim 1, further comprising:
    a temperature sensor responsive to a temperature of beverage in said collectors and connected to said microprocessor controller; and
    respective heaters controlled by said microprocessor controller in response to said temperature sensor positioned to heat the beverages in said collectors.

10. The automatic infusion apparatus defined in claim 1 wherein said unit is a replaceable package of respective filters and quantities of at least one substance to be infused, said package being provided with automatically readable indicia representing the quantity of infusion substance per filter, said apparatus further comprising reading means juxtaposed with said indicia upon insertion of said unit into said housing and connected to said microprocessor controller for signally to said microprocessor controller the quantity of said substance per filter, said microprocessor controller thereupon selecting a quantity of water to be fed to said filters in response to said indicia.

11. The automatic infusion apparatus defined in claim 10 wherein said indicia is a bar code and said reading means includes a bar-code reader.

12. The automatic infusion apparatus defined in claim 1, further comprising another distributor operated by said microprocessor and interposed between said unit and said collectors.

13. The automatic infusion apparatus defined in claim 1, further comprising a distributor sensor on said distributor and connected to said microprocessor controller for supplying to said microprocessor controller a signal representing a filter with which said distributor is in communication.

14. The automatic infusion apparatus defined in claim 1, further comprising selector means on said housing connected to said microprocessor controller for inputting instructions to said microprocessor including start/stop, timed operation and beverage-selection instructions.

15. The automatic infusion apparatus defined in claim 14 wherein said selector means is a keyboard.

16. The automatic infusion apparatus defined in claim 14 wherein said selector means is a row of touch-sensitive keys on said housing.

17. The automatic infusion apparatus defined in claim 14, further comprising a display on said housing and connected to said microprocessor controller for outputting a state of the apparatus generated by said microprocessor controller.

18. The automatic infusion apparatus defined in claim 1 wherein said housing has generally the shape of a rectangular parallelepiped and is formed with a lower portion containing said collector, a cover portion hinged on said lower portion and swingable upwardly therefrom, said unit being received on said lower portion and enclosed by said cover portion, said distributor being provided on said cover portion, said lower portion being formed with a plurality of brewing vessels of upwardly diverging frustoconical configuration above said collector said unit having downwardly converging filters of frustoconical configuration receivable in the respective brewing vessels.

19. The automatic infusion apparatus defined in claim 1 wherein two filter units are provided, each having a plurality of said filters and respective quantities of two different infusion substances.

20. The automatic infusion apparatus defined in claim 1, further comprising means controlled by said microprocessor controller for bypassing said filters with heated water and discharging a measured quantity of heated water on operator command without the formation of an infusion beverage therewith.

* * * * *